(12) United States Patent
Cabeza et al.

(10) Patent No.: US 11,717,014 B2
(45) Date of Patent: Aug. 8, 2023

(54) CRACKING-SHELLING MECHANISM FOR NUTS WITH A HARD OR SOFT SHELL

(71) Applicant: Jose Borrell S.A., Denia (ES)

(72) Inventors: Jerónimo Martin Cabeza, Denia (ES); Francisco Esteban Pastor Martí, Denia (ES); Josep V. Roig Borrell, Denia (ES)

(73) Assignee: Jose Borrell S.A.

( * ) Notice: Subject to any disclaimer, the term of this patent is extended or adjusted under 35 U.S.C. 154(b) by 312 days.

(21) Appl. No.: 16/932,223

(22) Filed: Jul. 17, 2020

(65) Prior Publication Data
US 2021/0022383 A1 Jan. 28, 2021

(30) Foreign Application Priority Data
Jul. 22, 2019 (ES) ................ ES201930680

(51) Int. Cl.
*A23N 5/00* (2006.01)

(52) U.S. Cl.
CPC .................... *A23N 5/008* (2013.01)

(58) Field of Classification Search
CPC ............. A23N 5/008; A23N 5/00–08
See application file for complete search history.

(56) References Cited

U.S. PATENT DOCUMENTS

| 4,526,092 A * | 7/1985 | Greenblatt ............. A47J 43/26 99/580 |
| 2008/0131569 A1* | 6/2008 | Schmilovitch ........... A23N 4/24 99/554 |
| 2020/0147821 A1* | 5/2020 | Carrasco ................ B26D 7/086 |

FOREIGN PATENT DOCUMENTS

| EP | 3398456 A1 * | 11/2018 | ............. A23N 5/00 |
| ES | 2016175 A | 10/1990 | |
| ES | 1230937 U | 6/2019 | |

OTHER PUBLICATIONS

Machine translation of ES 2016175 (Year: 1990).*

* cited by examiner

*Primary Examiner* — Erin E McGrath
(74) *Attorney, Agent, or Firm* — St. Onge Steward Johnston and Reens

(57) ABSTRACT

The invention relates to a cracking-shelling mechanism for nuts with a hard or soft shell, with a plurality of first and second blocks the facing sides of which have a plurality of complementary first and second notches in a staggered arrangement, wherein each first notch is associated with at least a second notch and forms a cracking hole with each one, wherein the notches have first and second vertexes for each hole, forming a specific angle with respect to the longitudinal axis, and in the standby position of the first block, said first and second vertexes of each first notch are arranged so as to coincide with second and first vertexes, respectively, of a second notch.

9 Claims, 5 Drawing Sheets

Detail A

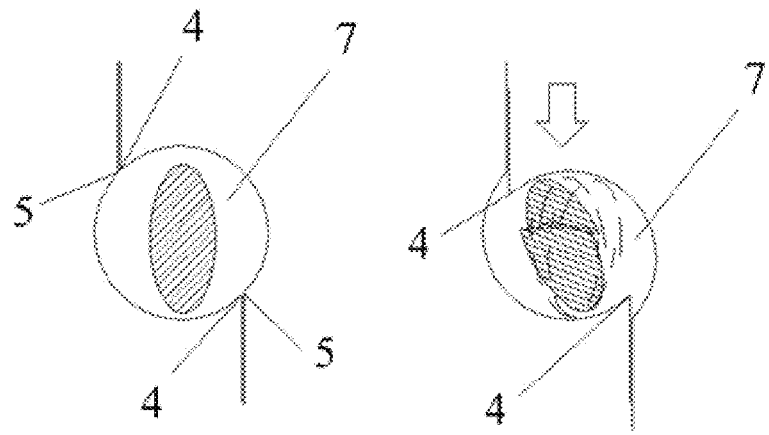
Fig. 5.1   Fig. 5.2
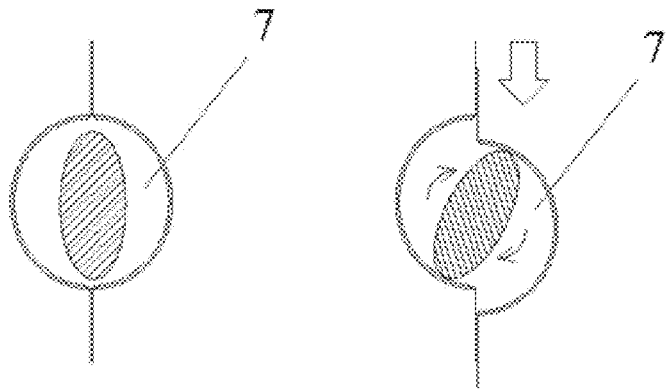
Fig. 6.1   Fig. 6.2

CRACKING-SHELLING MECHANISM FOR NUTS WITH A HARD OR SOFT SHELL

FIELD OF THE INVENTION

The present invention corresponds to the technical field of nut cracking and shelling machines, namely it corresponds to a cracking-shelling mechanism for nuts, having a plurality of first and second longitudinal blocks parallel to one another and arranged in an alternating manner, forming between them nut cracking and shelling holes.

BACKGROUND OF THE INVENTION

When cracking and shelling nuts, such as almonds and the like, one of the machines that has conventionally been used with better results is a machine that uses a cracking-shelling mechanism formed by a series of first blocks having reciprocating movement in both directions according to the longitudinal axis thereof, and a series of second blocks fixed with respect to the first blocks and arranged parallel to and in an alternating manner with respect to same.

On the sides of all these blocks there are notches arranged such that they coincide between the facing sides of each first and second adjacent blocks, such that they form frustoconical-shaped holes which, with the reciprocating movement of the first blocks, reduces and increases the section thereof in an alternating manner. Therefore, when the first blocks move in a first direction, the section is reduced and the nut is cracked and shelled, whereas when these first blocks move in the opposite direction, they allow the nut to fall and allow a new nut to enter through the upper part, which new nut will break with the next movement of said first blocks.

These fixed and sliding blocks have vertical holes according to quality sizes, adopting a frustoconical configuration from larger to smaller and from top to bottom, followed by a cylindrical part, obtaining the progressive breaking of the shell of the nut, with a final finish in the cylindrical lower part having the envisaged gauge, preventing nuts from going uncracked.

Although this machine properly cracks the nuts, it was susceptible to improvement because it did not allow the passage openings between the different blocks to be varied.

In this sense, the applicant presents a new invention, reference ES1230937, in which the cracking mechanism has a plurality of first and second parallel and intercalated rods or blocks, wherein the first rods continue to have a reciprocating movement in both directions according to the longitudinal axis thereof, and furthermore the second rods may have means for moving them according to the longitudinal axis thereof or according to an axis perpendicular to same.

As a result of the means for moving the second rods according to the axis perpendicular to same, regulation of the size of the holes is allowed so as to adapt them to the size of the nut to be cracked.

Today, a factor has emerged which is changing the effectiveness of these machines. Said factor is the introduction of new types of almonds having a more elongated shape than almonds that were conventionally treated.

This generates certain complication given that the more elongated shape of the new varieties causes the nut to rotate when the holes constrict with the movement of the first blocks in order to break it.

Therefore, the almond does not break and it is furthermore very likely that the corners formed in the holes when the first blocks move damage the nut given that said corners are introduced in the section of the hole as it constricts.

These corners are aligned according to a plane of movement of the first block with respect to the second block and are positioned very close to the nut, whereby they will easily damage same.

This mechanism furthermore has another drawback, because with these new types of longer almonds, the hole is too small for them and the nut often times becomes jammed.

Moreover, when the moisture content of the almond is low, conventional mechanisms involve a higher possibility of causing damage due to shearing or impacts on the kernels, which lessens product quality. To solve this and mitigate said effect, processing almonds with higher moisture percentages is normally advised, which may involve other drawbacks and be counterproductive for other phases of the process.

Therefore, although the mechanism has been effective up until now, the results are not so favorable, even being unfavorable with the new almond varieties in regard to the qualities obtained, as many of the kernels are left uncracked because a rotation takes place which prevents the mechanism from acting on them, and the kernels are damaged by the corners of the notches.

It is necessary to find a solution with a new mechanism or the variation thereof in order to continue obtaining an effective cracking and shelling of nuts, without damaging the nut and with a lower percentage of uncracked kernels.

SUMMARY OF THE INVENTION

The cracking-shelling mechanism for nuts with a hard or soft shell presented herein for nut shelling machines comprises a plurality of first longitudinal blocks parallel to one another, with a first end secured to means for reciprocating movement in both directions according to the longitudinal axis thereof, and a plurality of second longitudinal blocks parallel to the first longitudinal blocks and arranged in an alternating and adjacent manner with respect to same.

All the blocks have first and second ends, respective lower and upper bases, and two sides, such that between the sides of each first and second block there is formed a plurality of tapered vertical through holes between the upper and lower bases of the blocks.

In this mechanism, the facing sides between each first and second block comprise a plurality of first and second notches, respectively, complementary to one another and in a staggered arrangement, such that each first notch is associated with at least a second notch and forms a cracking hole with each second notch associated with it. Said first and second notches have, for each hole, first and second vertexes demarcating the contour thereof.

These vertexes are arranged such that the first vertex is farther away from the longitudinal axis of the corresponding block than the second vertex, and each first and second vertex of a hole is aligned forming a specific angle with respect to said longitudinal axis.

Therefore, in a standby position of the first block, each first and second vertex of each first notch is arranged so as to coincide with second and first vertexes, respectively, of a second notch, configuring a closed curved shape.

A significant improvement of the state of the art is obtained with the cracking-shelling mechanism for nuts with a hard or soft shell proposed herein.

This is because a mechanism is achieved in which the shape of the cracking holes is varied, not only the crosssection thereof, which may be circular, elliptical, or any other similar shape; but also the shape into which each of the holes is configured is varied.

Having said that, up until now each hole was formed by the joining of two identical halves, with each of said halves configured on one side of first and second blocks, respectively. One half would slide over the central plane for joining with the other half, and at least two of the vertexes demarcating the contour of each section half would be very exposed inside the hole, in the area where the nut is located.

With this new mechanism, the holes are not configured in this manner and in the event of a movement of the first block, the holes have two off-centered planes of movement, such that the movement of a half with respect to the other half does not occur, but rather the hole becomes smaller, allowing the nut to be trapped and broken and preventing it from rotating.

By configuring the holes in this manner, after the movement the vertexes are withdrawn much further into the hole and are not located in the area most exposed to the nut, so the percentage of damaged nuts is significantly reduced.

Moreover, each first notch may be associated with a second notch, in the case of a notch arranged at the end of the block, or with two notches, in the case of notches arranged in the middle or even at the end.

In the case of being associated with a second notch, it only forms one hole, but when it is associated with two second notches, it forms two holes, with the particularity that both holes are separated by a common separating element between said second notches, such that the movement of the first block causes one hole to constrict and the other one to widen.

Therefore, not all the holes are in the same situation, because while some are in a position for cracking the kernel, others are widened and allow a new kernel to be cracked to enter.

This allows the machine to be more productive and more effective because while some holes are loaded others crack and vice versa, which prevents accumulations.

This mechanism facilitates the cracking and shelling of the nut with lower levels of moisture than conventional machines, which prevents having to add water to the nut.

Moreover, it is a mechanism in which the second blocks have means for regulating their position, which allows said position to be varied based on the size of the nut, being much more effective and valid for a larger range of nut sizes.

It is therefore a very effective and easy-to-use mechanism which allows solving the problem existing today due to the introduction of new varieties of nuts such as the almond, and it does this obtaining a higher quality of nut as damages to same are reduced.

BRIEF DESCRIPTION OF THE DRAWINGS

For the purpose of helping to better understand the features of the invention according to a preferred practical exemplary embodiment thereof, a series of drawings is provided as an integral part of said description, wherein the following has been depicted in an illustrative and non-limiting manner:

FIGS. 5.1 and 5.2 show a schematic view of the section of a hole in respective standby and moved positions of the first block; respectively, for a preferred embodiment of the invention.

FIGS. 6.1 and 6.2 show a schematic view of the section of a hole in respective standby and moved positions of the first block, respectively, in a conventional mechanism of the state of the art.

DETAILED DESCRIPTION OF THE INVENTION

Figure 1:
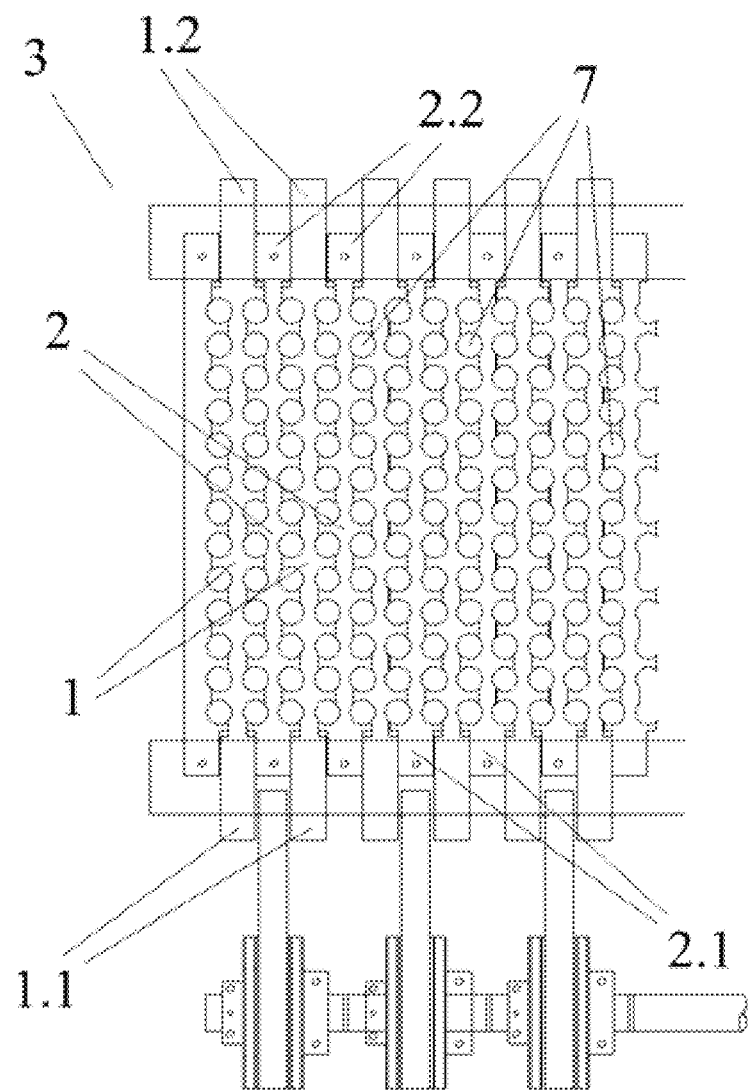
FIG. 1 shows a plan view of a cracking-shelling mechanism for nuts with a hard or soft shell, in a standby position of the first blocks, for a preferred embodiment of the invention.

In view of the figures that have been provided, it can be observed how, in a preferred embodiment of the invention, the cracking-shelling mechanism (3) for nuts with a hard or soft shell proposed herein for nut shelling machines comprises a plurality of first longitudinal blocks (1) parallel to one another, with a first end (1.1) secured to means for reciprocating movement in both directions according to the longitudinal axis thereof, and a plurality of second longitudinal blocks (2) parallel to the first longitudinal blocks and arranged in an alternating and adjacent manner with respect to same.

All the blocks (1, 2) have first and second ends (1.1, 1.2, 2.1, 2.2), respective lower and upper bases, and two sides (6). Likewise, between the sides (6) of each first and second block (1, 2) there is formed a plurality of tapered vertical through holes (7) between the upper and lower bases of the blocks.

In this mechanism (3) the facing sides (6) between each first and second block (1, 2) further comprise a plurality of first and second notches (8.1, 8.2), respectively, complementary to one another and in a staggered arrangement, such that each first notch (8.1) is associated with at least a second notch (8.2) and forms a cracking hole (7) with each second notch (8.2) associated with it.

Figure 2:
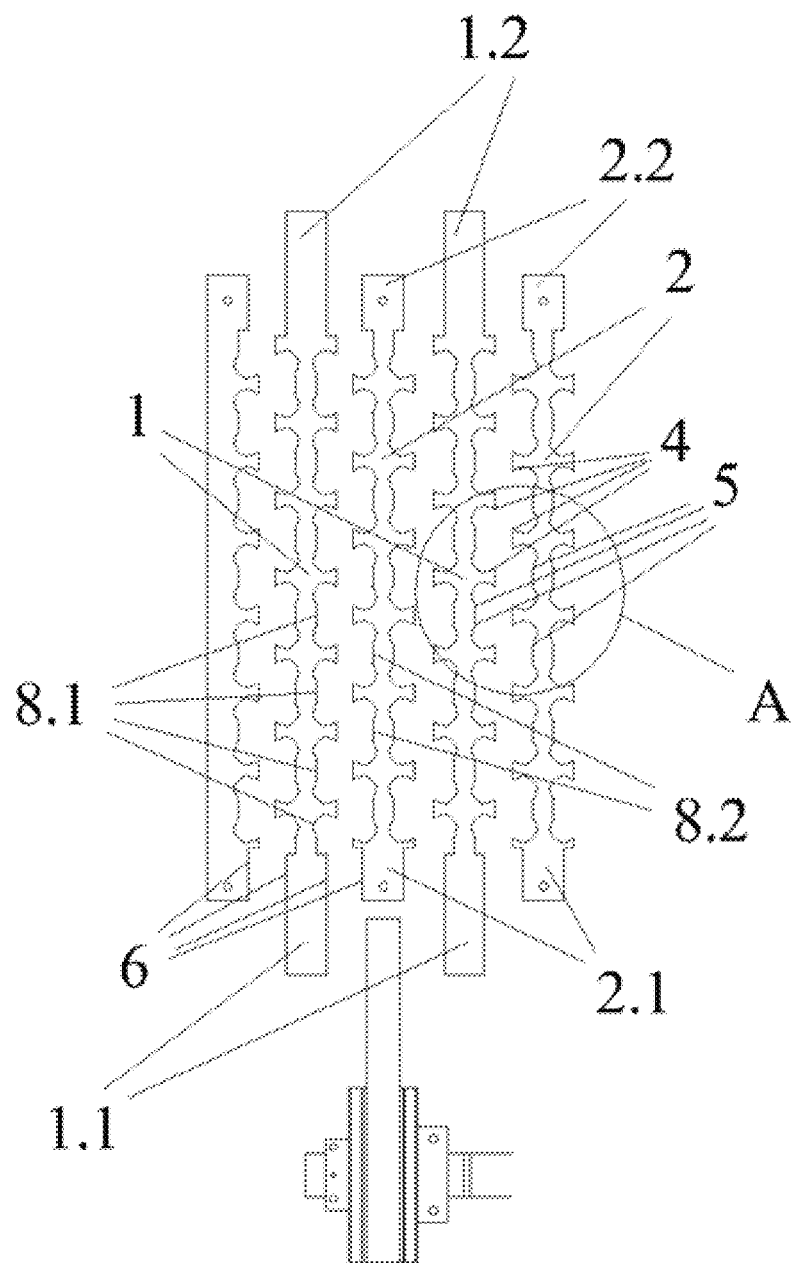
FIG. 2 shows an exploded view of two first blocks and three second blocks alternating with same, of a cracking-shelling mechanism for nuts with a hard or soft shell, for a preferred embodiment of the invention.
Figure 4:
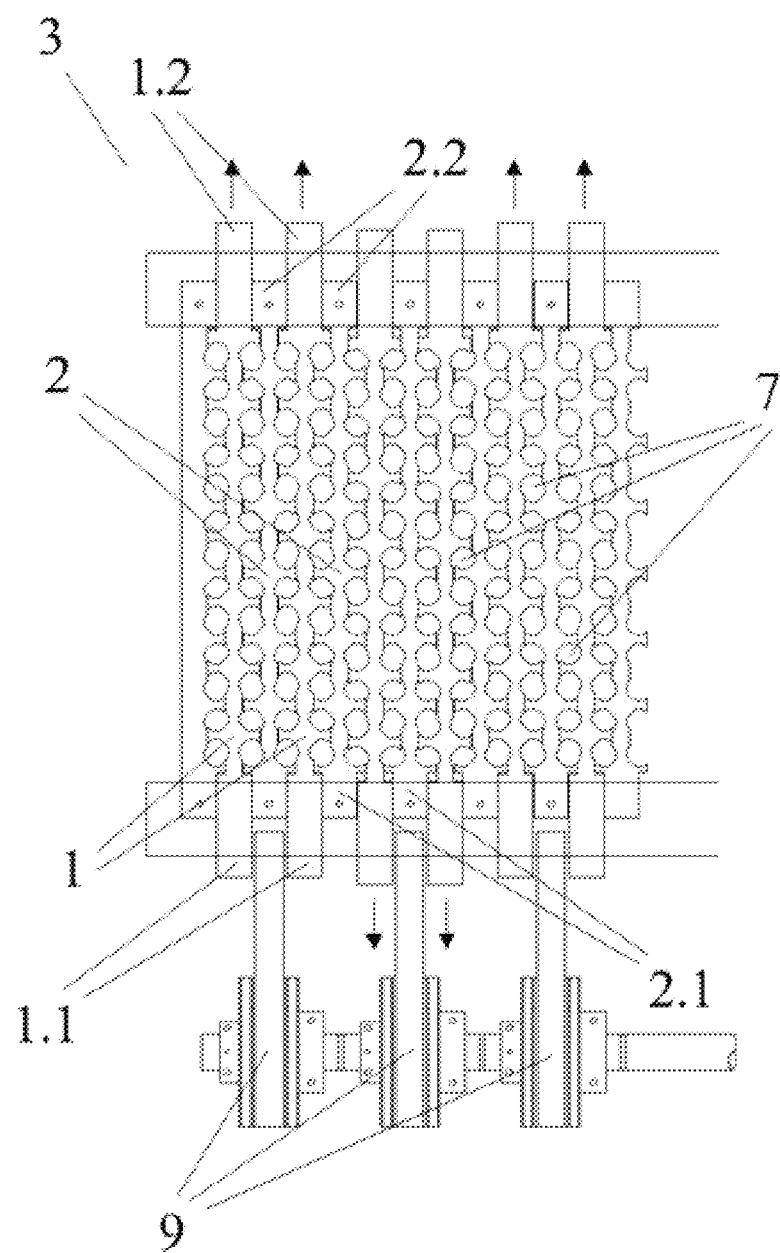
FIG. 4 shows a plan view of a cracking-shelling mechanism for nuts with a hard or soft shell, in a movement position of the first blocks, for a preferred embodiment of the invention.

Having said that, as shown in FIGS. 1, 2, and 4, each first block (1) has a first notch (8.1) arranged at a first end (1.1) thereof which is associated with a single second notch (8.2) of the second block (2), and therefore that first notch (8.1) forms a single hole (7). The remaining first notches (8.1) of the first blocks (1) are associated with two second notches (8.2) and form a hole (7) with each of them, therefore each of these first notches (8.1) forms two holes (7) each.

In the case of the second notches (8.2), since they are in a staggered arrangement with respect to the first notches (8.1), the same occurs but opposite to what occurs in the first block, i.e., it is the second notch (8.2) arranged at the second end of each second block (2) which is associated with a single first notch (8.1) and therefore forms a single hole (7), whereas the remaining second notches (8.2) are associated with two first notches (8.1) and therefore form two holes (7) each.

Figure 3:
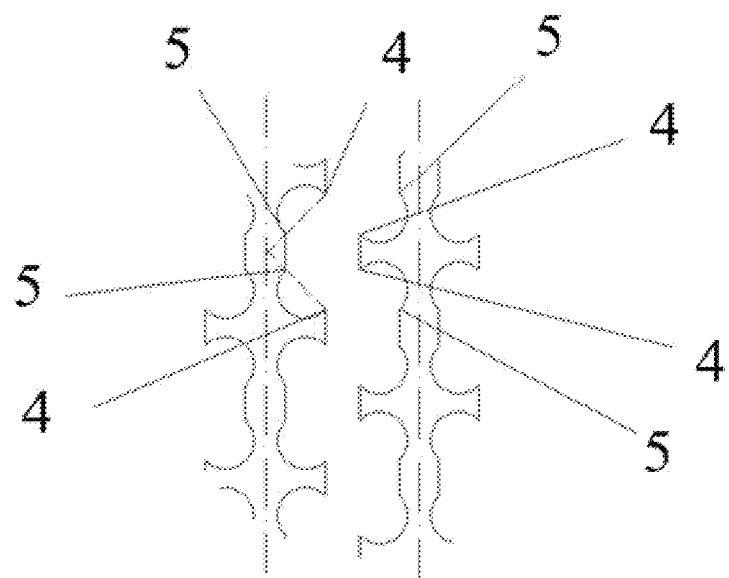
FIG. 3 shows a view of the detail A of FIG. 2, for a preferred embodiment of the invention.

As can be observed in FIG. 3, these first and second notches (8.1, 8.2) have, for each hole (7), first and second vertexes (4, 5) demarcating the contour thereof, arranged such that the first vertex (4) is farther away from the longitudinal axis of the corresponding block than the second vertex (5), and each first and second vertex (4, 5) of a hole (7) is aligned forming a specific angle with respect to said longitudinal axis.

Likewise, as shown in FIGS. 1, 2, and 5.1, in a standby position of the first block (1) each first and second vertex (4, 5) of each first notch (8.1) is arranged so as to coincide with second and first vertexes (5, 4), respectively, of a second notch (8.2), configuring a closed curved shape.

As can be observed in FIG. 5,2, depicting the hole (7) after the movement of the first block (1), the first and second vertexes (4, 5) of the first notch (8.1) are moved with respect to the respective corresponding second and first vertexes (5, 4) of the second notch, such that the first vertex (4) of both first and second notches (8.1, 8.2) is arranged in both cases inside the hole (7), but at the same time it is significantly separated from the area where the nut is located, therefore the risk of the nut being damaged by said vertexes is significantly reduced.

FIGS. 6.1 and 6.2 show the position of the vertexes in the case of standby and of movement, respectively, of the first block in a conventional mechanism of the state of the art, and as can be observed, the first and second vertexes are much more exposed and closer to the area where the nut is located in this case, and this is why nuts today present a high percentage of damage and scratching.

In this preferred embodiment of the invention, the first and second vertexes (4, 5) demarcating the contour of a hole (7) in each first and second notch (8.1, 8.2) are aligned forming an angle comprised between 30° and 60° or between 120° and 150° with respect to the longitudinal axis of the corresponding block.

Likewise, in this embodiment at least a first and/or a second notch (8.1, 8.2) forms respective holes (7) with respective second and/or first notches (8.2, 8.1), respectively, and the first and second vertexes (4, 5) demarcating the contour of a hole (7) are arranged in a manner symmetrical to the first and second vertexes (5, 4) demarcating the contour of the other hole (7) of one and the same notch.

Therefore, as shown in FIGS. 1 and 2, in the first notches (8.1) of each first block (1) having a single hole (7), the latter has first and second vertexes (4, 5) forming an angle comprised between 30 and 60° or between 120° and 150°, according to the side of the first block (1) being considered.

The remaining first notches have first and second vertexes (4, 5) with the same inclination as the vertexes of the first notch (8.1) arranged at the first end (1.1), and a second hole (7), the first and second vertexes (4, 5) of which are arranged symmetrically with respect to the aforementioned vertexes, therefore if the aforementioned vertexes form an angle comprised between 30° and 60°, the other vertexes form an angle comprised between 120° and 150°, and vice versa.

In this preferred embodiment of the invention, the sides (6) of each block are symmetrical with respect to a longitudinal central plane thereof. The cracking holes (7) will thereby be formed in a manner symmetrical to each side of the block.

According to another aspect, in this preferred embodiment of the invention the second blocks (2) comprise means for regulating the position according to the direction of an axis perpendicular to same and parallel to the longitudinal axis of the holes. It is thereby possible to modify their position in one direction or the other, achieving a reduction or increase in the size of cracking holes (7).

Namely in this case, the means for regulating the position of said second blocks (2) are independent for each of them, so, for example, the size of the holes (7) may be established by areas, according to the size of the nut reaching each of them from prior screening. Nevertheless, in other cases the regulating means may be common to all the second blocks (2).

As shown in FIGS. 1 to 4, in this preferred embodiment of the invention the means for reciprocating movement of the first blocks (1) are formed by a respective connecting rod (9) with an eccentric axis of rotation. In this case, every two first blocks (1) are connected to one and the same connecting rod (9), so two first blocks (1) have one and the same movement, which may be identical to or different from the movement of other first blocks (1) connected to another connecting rod (9).

Having said that, it can be observed in FIG. 4 that first blocks (1), the ones located in the center of the figure are moved in one direction, whereas first blocks (1) arranged at the ends in the figure are moved in the opposite direction. The respective holes (7) increase and decrease in size based on their position with respect to the corresponding block and on the direction of movement thereof. When the holes (7) increase in size, on one hand the nut is allowed to enter the hole (7) and at the same time, if a nut kernel has previously been cracked, it is allowed to exit same through the lower part, whereas when the holes (7) decrease in size, the kernel is cracked.

As a result of the shape and arrangement of the first and second notches (8.1, 8.2), while one hole of a specific notch increases in size, the other hole thereof decreases in size, such that there is always a number of holes that allow the nut to enter while at the same time there is another number of holes which are cracking the nut at that time. Therefore accumulations are not generated, and effectiveness of the mechanism is increased.

In other preferred embodiments of the invention, the means for reciprocating movement of the first blocks (1) are formed by a respective pneumatic piston, a respective electromagnetic mechanism, or a similar mechanism, capable of generating this type of movement.

The described embodiment constitutes only one example of the present invention; therefore, the specific details, terms, and expressions used in the present specification should not be considered as limiting, but rather must be understood solely as a basis for the claims and as a representative basis which provides a comprehensible description as well as sufficient information for one skilled in the art to apply the present invention.

What is claimed is:

1. A cracking-shelling mechanism for nuts with a hard or soft shell, for nut shelling machines, comprising:
   a plurality of first longitudinal blocks parallel to one another which are configured to reciprocate in both directions according to a longitudinal axis thereof, and
   a plurality of second longitudinal blocks parallel to the first longitudinal blocks and arranged in an alternating and adjacent manner with respect to same, wherein all the blocks have first and second ends, respective lower and upper bases, and two sides, and wherein between the sides of each first and second block there is formed a plurality of tapered vertical through holes between the upper and lower bases of the blocks,
   facing sides between each first and second block comprise a plurality of first and second notches, respectively, complementary to one another and in a staggered arrangement, such that each first notch is associated with at least a second notch and forms the through hole with each second notch associated with it,
   said first and second notches have, for each hole, first and second vertexes demarcating a contour thereof, arranged such that the first vertex is farther away from the longitudinal axis of the corresponding block than the second vertex, and each first and second vertex associated with hole is aligned forming a specific angle with respect to said longitudinal axis, and wherein in a standby position of the first block, each first and second vertex of each first notch is arranged so as to coincide with second and first vertexes, respectively, of a second notch, configuring a closed curved shape.

2. The cracking-shelling mechanism for nuts with a hard or soft shell according to claim 1, wherein the first and second vertexes demarcating the contour of a hole in each first and second notch are aligned forming an angle comprised between 30° and 60° or between 120° and 150° with respect to the longitudinal axis of the corresponding block.

3. The cracking-shelling mechanism for nuts with a hard or soft shell according to claim 2, wherein at least one of the first and/or second notches forms respective holes with respective second and/or first notches, respectively, and the first and second vertexes demarcating the contour of a hole are arranged in a manner symmetrical to the first and second vertexes demarcating the contour of another hole.

4. The cracking-shelling mechanism for nuts with a hard or soft shell according to claim 1, wherein the sides of each block are symmetrical with respect to a longitudinal central plane thereof.

5. The cracking-shelling mechanism for nuts with a hard or soft shell according to claim 1, wherein the second blocks comprise a regulator which regulates a position according to the direction of an axis perpendicular to the regulator and parallel to the longitudinal axis of the holes.

6. The cracking-shelling mechanism for nuts with a hard or soft shell according to claim 5, wherein the regulator which regulates the one of the second blocks comprise a plurality of regulators which are each independent for each of the second blocks.

7. The cracking-shelling mechanism for nuts with a hard or soft shell according to claim 1, wherein the a first end of the plurality of first longitudinal blocks are connected to a reciprocating mechanism which comprises a plurality of reciprocating mechanisms which are formed by a respective connecting rod with an eccentric axis of rotation.

8. The cracking-shelling mechanism for nuts with a hard or soft shell according to claim 1, wherein a first end of the plurality of first longitudinal blocks are connected to a reciprocating mechanism which comprises a plurality of reciprocating mechanisms which are each formed by a respective pneumatic piston.

9. The cracking-shelling mechanism for nuts with a hard or soft shell according to claim 1, wherein the a first end of the plurality of first longitudinal blocks are connected to a reciprocating mechanism which comprises a plurality of reciprocating mechanisms which are each formed by a respective electromagnetic mechanism.

* * * * *